United States Patent [19]

Cymbalski et al.

[11] Patent Number: 5,324,923
[45] Date of Patent: Jun. 28, 1994

[54] APPARATUS FOR PRODUCING A DYNAMICALLY VARIABLE MACHINE READABLE BINARY CODE AND METHOD FOR READING AND PRODUCING THEREOF

[75] Inventors: Robert S. Cymbalski, Clearwater; Christen V. Nielsen, Dunedin, both of Fla.

[73] Assignee: International Data Matrix, Inc., Clearwater, Fla.

[21] Appl. No.: 694,616

[22] Filed: May 7, 1991

Related U.S. Application Data

[63] Continuation-in-part of Ser. No. 513,362, Apr. 24, 1990, Pat. No. 5,053,609, which is a continuation of Ser. No. 190,205, May 5, 1988, Pat. No. 4,939,354.

[51] Int. Cl.$^5$ .................... G06K 7/10; H03M 13/00
[52] U.S. Cl. .................... 235/454; 235/494; 371/43; 341/95
[58] Field of Search .................. 341/95; 235/436, 437, 235/454, 456, 494; 371/43

[56] References Cited

U.S. PATENT DOCUMENTS

| | | |
|---|---|---|
| 3,632,995 | 1/1972 | Wilson . |
| 3,763,467 | 10/1973 | Cash et al. . |
| 4,113,993 | 9/1978 | Heckman et al. . |
| 4,430,563 | 2/1984 | Harrington .................. 235/494 |
| 4,439,672 | 3/1984 | Salaman ...................... 235/463 |
| 4,554,529 | 11/1985 | Moriyama et al. ............ 341/95 |
| 4,695,991 | 9/1987 | Hudson ......................... 369/44 |
| 4,707,681 | 11/1987 | Eggenberger et al. ......... 341/95 |
| 4,734,565 | 3/1988 | Pierce et al. .................. 235/454 |
| 4,814,589 | 3/1989 | Storch .......................... 235/375 |
| 4,874,936 | 10/1989 | Chandler et al. . |
| 4,924,078 | 1/1987 | Sant'Anselmo ............... 235/494 |
| 5,008,669 | 4/1991 | Ishibushi et al. .............. 341/95 |

FOREIGN PATENT DOCUMENTS

| | | |
|---|---|---|
| 227473 | 7/1987 | European Pat. Off. .......... 371/43 |
| 0278740 | 8/1988 | European Pat. Off. . |
| 2906456 | 10/1980 | Fed. Rep. of Germany . |
| 3604779 | 8/1987 | Fed. Rep. of Germany . |
| 8605906 | 10/1986 | PCT Int'l Appl. . |

OTHER PUBLICATIONS

Gruidel, Honomichl, Lujan "Variable Grid Detection", *IBM Technical Disclosure Bulletin*, vol. 25, No. 3B, Aug. 1982.

*Primary Examiner*—John Shepperd
*Attorney, Agent, or Firm*—Davis Hoxie Faithfull & Hapgood

[57] ABSTRACT

An apparatus for forming a dynamically variable machine readable N-ary code executes operations on an electronic code. The apparatus includes a generator for generating a machine readable non-electronic code in response to the received electronic code. A data integrity enhancer forms the electronic code into output blocks which are formed as a linearly determined function of the binary values of the N-ary digits of the electronic binary code.

25 Claims, 5 Drawing Sheets

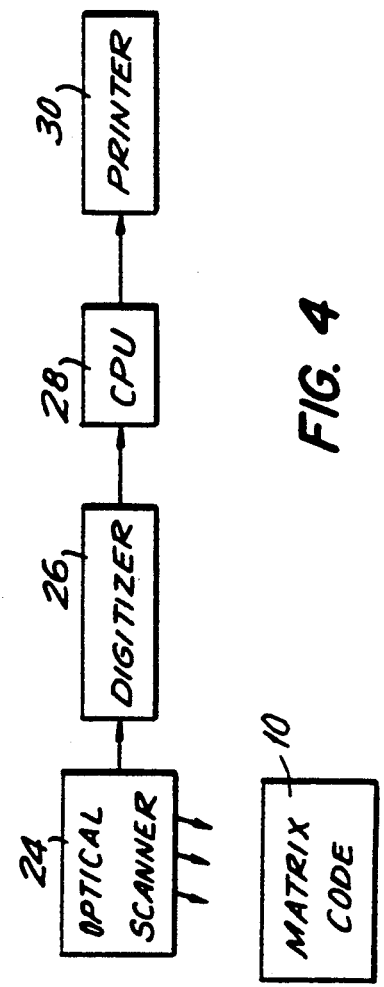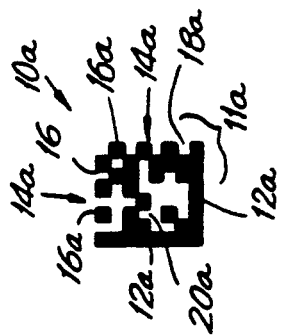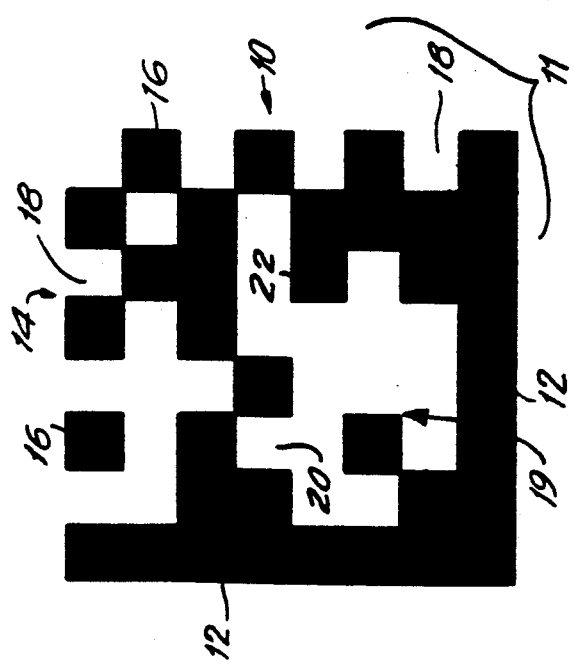

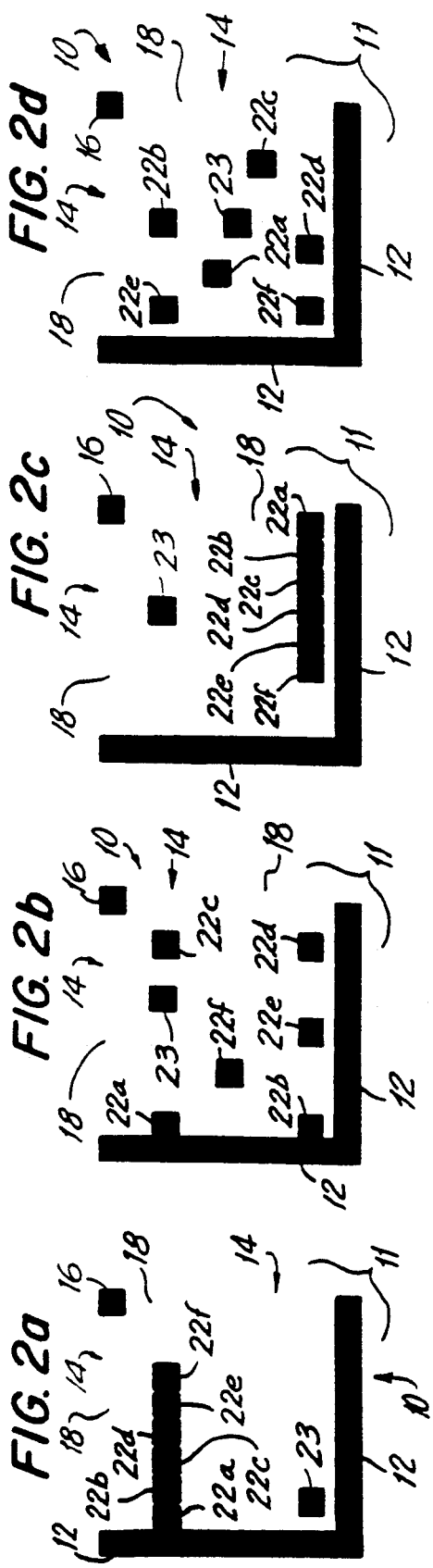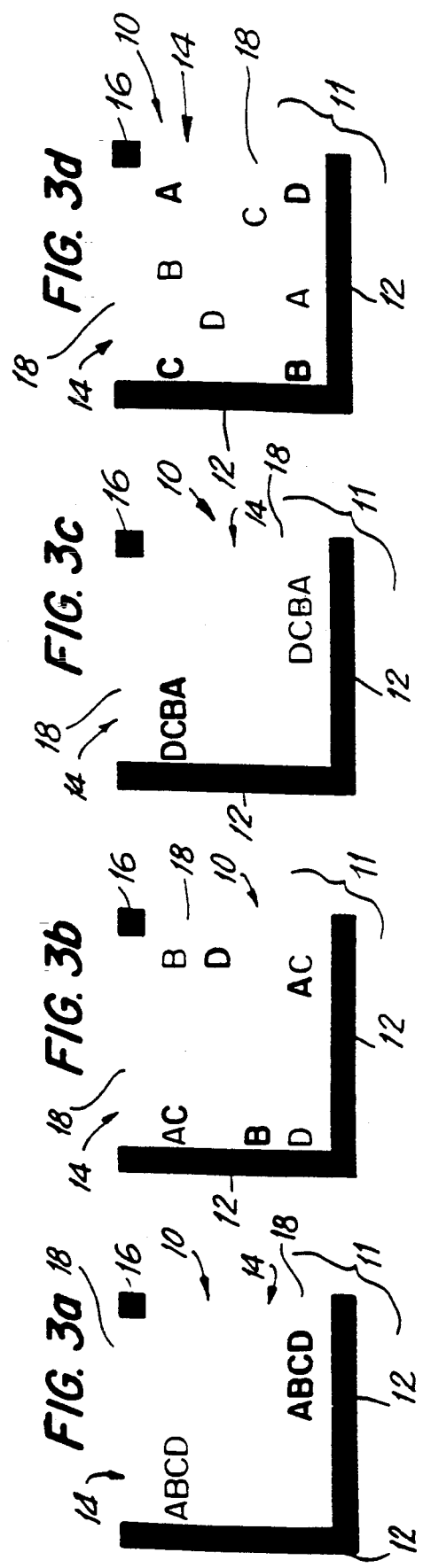

APPARATUS FOR PRODUCING A DYNAMICALLY VARIABLE MACHINE READABLE BINARY CODE AND METHOD FOR READING AND PRODUCING THEREOF

CROSS-REFERENCE TO RELATED APPLICATIONS

This is a continuation in part of co-pending U.S. Pat. application No. 07/513,362 filed Apr. 24, 1990 which is a continuation of U.S. Pat. application No. 07/190,205 filed on May 5, 1988, now U.S. Pat. No. 4,939,354.

BACKGROUND OF THE INVENTION

This invention relates to a dynamically variable binary code which is readable by a machine, and in particular, to a binary code having high data integrity.

Optically readable codes are known in the art. One such code is formed as a "checker board" symbol that represents a pattern in the form of black and white squares. Each square contained within the checker board matrix is of equal size to every other square. Furthermore, the number and size of the squares contained within the matrix is predetermined. Accordingly, the computer receiving or producing the pattern expects a specific number of squares contained within the matrix each being of a preset size. This code has not been satisfactory. The code is unable to dynamically expand or contract capacity to meet changing user requirements without the intervention of re-programming the software of the scanning computer. Accordingly, the user of the code must identify the requirements prior to implantation of the software system. Additionally, since each square must be of the exact same size and the number of squares is predetermined, the scanning computer must be preset for the expected matrix size thereby limiting the user to a single sized checker board code for each scanner. This necessitates a plurality of code scanners and a system for separating each different sized, different density code and forwarding it to the appropriate scanner.

Codes which overcome these shortcomings by providing indicia associated with the code for informing the computer as to the size of the code are known in the art. One example of such a code is found in U.S. Pat. No. 3,763,467 which discloses the optical reading of data set up in box fashion upon a card. The card is marked at its periphery with two field defining marks located at the front and trailing edges of the box indicating the size of the field containing binary coded decimal data stored within the box. The first row of data within the box, forming the perimeter edge, contains format information identifying which of the columns within the box is to be read. This code has also been less than satisfactory in that it suffers from density and size problems. Even though the size of the field is variable, the actual size of the characters within the field is not. Accordingly, a smaller field size results in smaller amounts of stored information. Furthermore, the size indicia being read must be in a particular location in order to be received and understood by the scanning equipment.

Additionally, each of these codes suffer from the disadvantage that if a portion of the code is obliterated, changed or covered, then the data is destroyed making it difficult if not impossible to read the code. One solution to this data integrity problem is found in related U.S. Pat. No. 4,939,354 to Dennis Priddy and Robert Cymbalski, of which the present application is a Continuation-In-Part, in which character redundancy is provided in which the character representation of data is expanded to decrease the probability that obliteration of a part of the code obliterates the entire data message. The result is higher code integrity. However, by expanding the number of bits in which the character is encoded, a large bit overhead is required so that much of the code physical area is utilized for this data integrity, rather than additional information.

Accordingly, it is desired to provide a dynamically variable machine optically readable binary code and method for reading and producing thereof which overcomes the shortcomings.

SUMMARY OF THE INVENTION

Generally speaking, in accordance with the invention, a machine readable binary code which is dynamically variable in size, format and density of information is provided. The code is formed of a matrix containing data. The data is operated on utilizing convolutional logic so that the data is broken up into output blocks of a predetermined number of bits. The output blocks are produced by performing convolutional logic on the data string. The matrix is formed of these output blocks. Each of the output blocks is related by a determinable function to the previously formed output block and the following output block so that the true makeup of the output block can be determined by comparing the previously formed output block and the following formed output block to determine data integrity.

The matrix has a first side and a second side each being formed of identical broken line patterns of alternating darkened and lightened areas. The first side and second side intersect at a first corner. The product of the number of lightened areas and darkened areas of the first side and the number of lightened areas and darkened areas of the second side corresponds to the amount of information contained within the code. A third side and a fourth side are each formed as a solid line of equal darkness intersecting at a second corner. The solid lines correspond to the length, height and area of the code.

The information may also be stored in a plurality of patterns within the matrix. Various bit scattering patterns increase data survivability, since bits which are closely tied logically are not closely tied physically within the matrix.

The code is read by an optical scanner and by measuring the solid black lines, the physical size of the matrix is determined. By scanning the broken line pattern of the other perimeter sides, the amount of information contained within the matrix may be determined. The computer may then independently determine both size and density of the matrix being scanned.

Accordingly, it is an object of this invention to provide an improved readable binary code.

Another object of the invention is to provide a machine readable binary code with high data integrity and low data overhead.

Still another object of the invention is to provide a linear deterministic method for generating a code which enables detection of code errors by comparing the serially generated subgroups of the data encoded in the code.

Yet a further object of the invention is to provide a data file which provides high data integrity while economically utilizing data bits for both data information and data integrity.

Another object of this invention is to provide a machine readable binary code which allows a scanning computer to independently recognize, understand and act upon the encoded information regardless of the actual physical size or volume of data contained within the symbol.

A further object of this invention is to provide a machine readable binary code which may be read and processed regardless of the angle orientation of the symbol to the scanner.

Yet another object of this invention is to provide a machine readable binary code which may dynamically encode large quantities of information in any physical size.

Still another object of this invention is to provide a machine readable binary code which enables the computer to independently recognize and decode the information contained within the code regardless of the physical size, data density, or angle of rotation of the code relative to the reader.

Yet another object of this invention is to provide a machine readable binary code which allows the density of the code matrix to be dynamically determined and computer generated without requiring user involvement.

Yet another object of the present invention is to provide a machine readable binary code and method for processing thereof which gives the user absolute control over a selection of a physical size of the code as well as the volume of the data which is encoded therein.

Still other objects and advantages of the invention will in part be obvious and will in part be apparent from the specification and drawings.

The invention accordingly comprises the several steps and the relation of one or more of such steps with respect to each of the others, and the article possessing features, properties and relation of elements, which are exemplified in the following detailed disclosure, and the scope of the invention will be indicated in the claims.

BRIEF DESCRIPTION OF THE DRAWINGS

For a fuller understanding of the invention, reference is had to the following description, taken in connection with the accompanying drawings, in which:

FIGS. 1a and 1b depict two binary codes in accordance with the invention, of different sizes, but containing the same information;

FIGS. 2a-2d illustrate the arrangement of data within the perimeter of the binary code in accordance with the invention;

FIGS. 3a-3d illustrate the redundant formation of visual cells within the matrix in accordance with the invention;

FIG. 4 is a block diagram of an apparatus for processing and scanning the code in accordance with the invention;

DETAILED DESCRIPTION OF THE PREFERRED EMBODIMENTS

Figure 5:
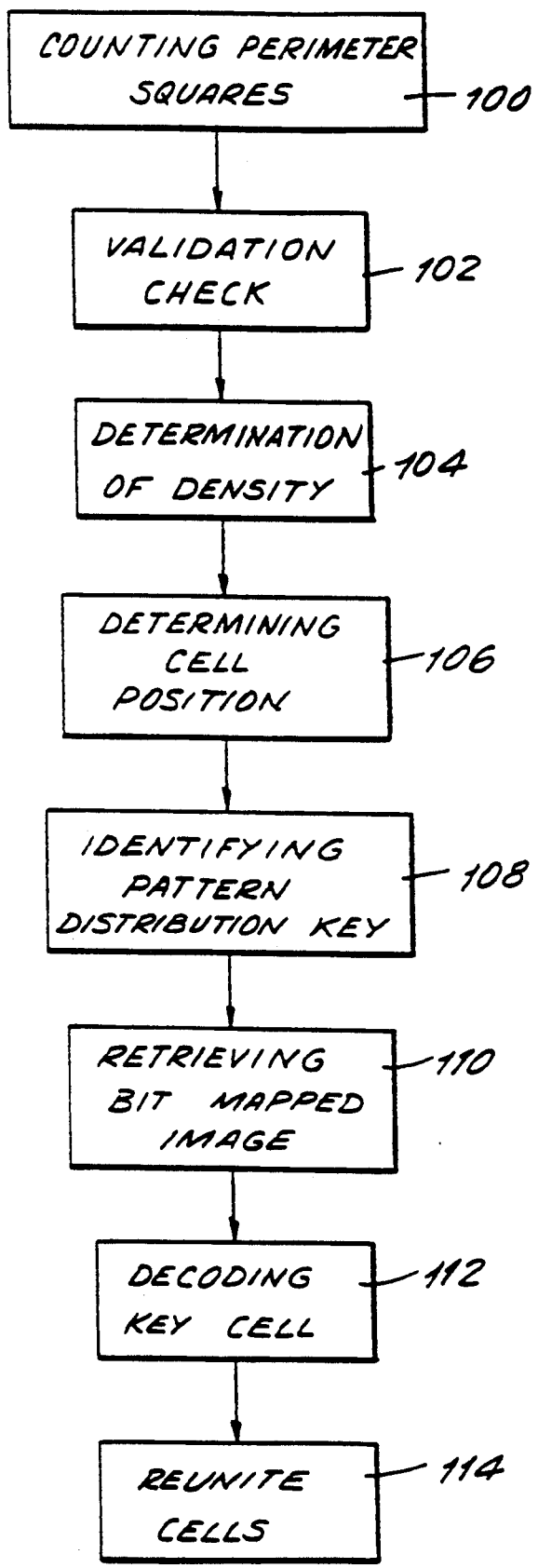
FIG. 5 is a flowchart depicting the process for reading the binary code.

Reference is made to FIG. 1a, wherein a binary code, generally indicated as a matrix 10, constructed in accordance with the invention is presented. Binary code matrix 10 has a perimeter 11 formed by intersecting sides 12 formed of solid lines and intersecting perimeter sides 14 formed of dark perimeter squares 16 and light perimeter squares 18 in an alternating pattern. Data, generally indicated as 19, is stored within perimeter 11 of matrix 10.

Data 19 is stored within the perimeter of matrix 10 by converting each character to be stored into a visual binary code represented by dark and light squares corresponding to ones and zeros of binary information. A letter or number represented by the binary code 0001 may be represented by a string of data cells, each cell containing either a dark square or light square. Accordingly, the data representing 0001 would appear as a series of three light data cells and one dark data cell. For example, the numbers 0 through 9. are stored within matrix 10 as a pattern of light cells 20 and dark cells 22.

Binary representation of the one hundred twenty-eight (128) US-ASCII letters, (used by way of example of alphanumeric data) numbers and symbols requires eight binary bits, or in the case of matrix 10, eight visual squares or cells to represent a character. However, by defining the maximum range of characters that may appear at each position of the input string, it is possible to suppress those binary bits which contain information redundant and common to the entire range of characters thereby compressing the required number of visual squares to represent a single character to less than eight. In one embodiment, in which only the letters A through D are anticipated to appear in the first position of an input string, only two visual squares are required to reflect the four possible binary bit configurations. Where the presence of a dark cell is indicated by "D" and the light cell is indicated by "L," the letter A would be represented as LD. The letter B would be represented as DL, the letter C as DD and the letter D as LL, all represented by using only two cells of visual binary information. Similarly, if in a second character position of the input string it is known that only numeric values from 0 through 9 will appear, only 3.32 visual cells need be reserved to accommodate the ten possible binary variations for forming this character. Accordingly, in the above embodiment, a total of six visual squares or cells need be reserved to reflect the two characters of encoded information rather than the sixteen cells of the US-ASCII system.

The size of the square and the number of cells contained within the perimeter of the square are determined from the code perimeter 11. Solid lines 12 indicate the physical size of matrix 10.

For ease of explanation a square matrix 10 having equal sides 12 is presented. However any parallelogram, such as a rectangle, having an area computable by length and height may be used.

Side 14 indicates the density or number of cells 20, 22 contained within matrix 10. The number of alternating squares 16, 18 beginning with first light square 18 adjacent each perimeter line 12, corresponds to the square root of the number of visual cells 20, 22 contained within the perimeter of matrix 10 rounded up to the nearest number. In this example, the square adjacent perimeter line 12 is a light square 18, however, in a matrix having a different number of cells 20, 22 contained therein, side 14 may begin with a dark square 16 to obtain an appropriate value for the number of alternating squares 16, 18.

In an exemplary embodiment, the numerals 0 through 9 are encoded within matrix 10 utilizing thirty-six visual cells 20, 22 and being encased in a matrix 10 having a perimeter side 14 containing six alternating dark squares 16 and light squares 18. By providing a perimeter which indicates the matrix size as well as the number of visual cells contained within matrix 10 and in binary form, a binary code matrix 10 is provided which, as will be discussed below, is recognizable and identifiable by a scanning computer regardless of physical size or information density.

By comparison, a matrix 10A depicted in FIG. 1b contains the same information in the same format as matrix 10 and has a perimeter 11a but at a smaller scale having smaller perimeter sides 12a and 14a. Accordingly, physical size of the code may be unlimited By providing a format for indicating to the scanning computer the size and density of the matrix in machine readable form, machine readability of a variety of different size and information density binary codes by a single optical scanner computer system is possible In exemplary embodiments, the physical size may range from one-tenth of an inch square to fourteen inches square, but is limited only by the ability of the user's print device to create the selected size.

Reference is now also made to FIGS. 2a through 2d in which the arrangement of visual cells 22 within matrix 10 is depicted, like elements from FIG. 1a being assigned like reference numerals. A character may be represented by dark visual cells 22a, 22b, 22c, 22d and 22e. Visual cells 22a through 22e may be situated in a variety of patterns within matrix 10. Visual cells 22 maybe in serial order in one corner of matrix 10 (FIG. 2a), visual cells 22 may be scattered about in each corner of matrix 10 (FIG. 2b), visual cells 22 maybe in reverse serial order in a corner of matrix 10 (FIG. 2c) or they may be randomly distributed within matrix 10 (FIG. 2d). Various bit scattering patterns increase data integrity, i.e. survivability, since bits which are closely tied logically are not closely tied physically within matrix 10. Accordingly, destruction of a portion of the physical code will not result in destruction of entire binary characters.

Each matrix 10 may be keyed to a specific visual cell placement depending upon the needs of each specific user. This enables a user to have patterns which are readable by either all users of a binary code, or only by specific users of the binary code, as for example, in top secret verification facilities. A key 23 for determining which pattern is used, is encoded in visual cells contained within perimeter 11 of matrix 10 at a known reference position within matrix 10. For example, key visual cell 23 may be a certain distance from the intersection of solid lines 12. Additionally, a mixture of both public and secret patterns may be present within the same structure to enable the general public to read part of what is contained within the matrix 10 and only certain sections of the public to read what is contained within the rest of matrix 10. In a preferred embodiment, there are 256 pattern variations for situating visual cells 22, 23 within matrix 10.

To provide data integrity, data 19 may also be stored more than once providing the redundancy in the information as encoded within matrix 10. The redundancy may range from a factor of no redundancy to 400% redundancy. Furthermore, as illustrated in FIGS. 3a-3d, the redundancy need not be in the same pattern as the root cells. Visual cells A, B, C, D are positioned within matrix 10 a plurality of times. The root cell, shown by the darker letters, may be replicated in a mirror image (FIGS. 3a, 3b, 3c) or in a random pattern (FIG. 3d) as long as identical visual cells such as A, A are not adjacent each other. Accordingly, through redundancy the code is not lost if a portion of the matrix is destroyed or deformed during normal transit or use.

Figure 6:
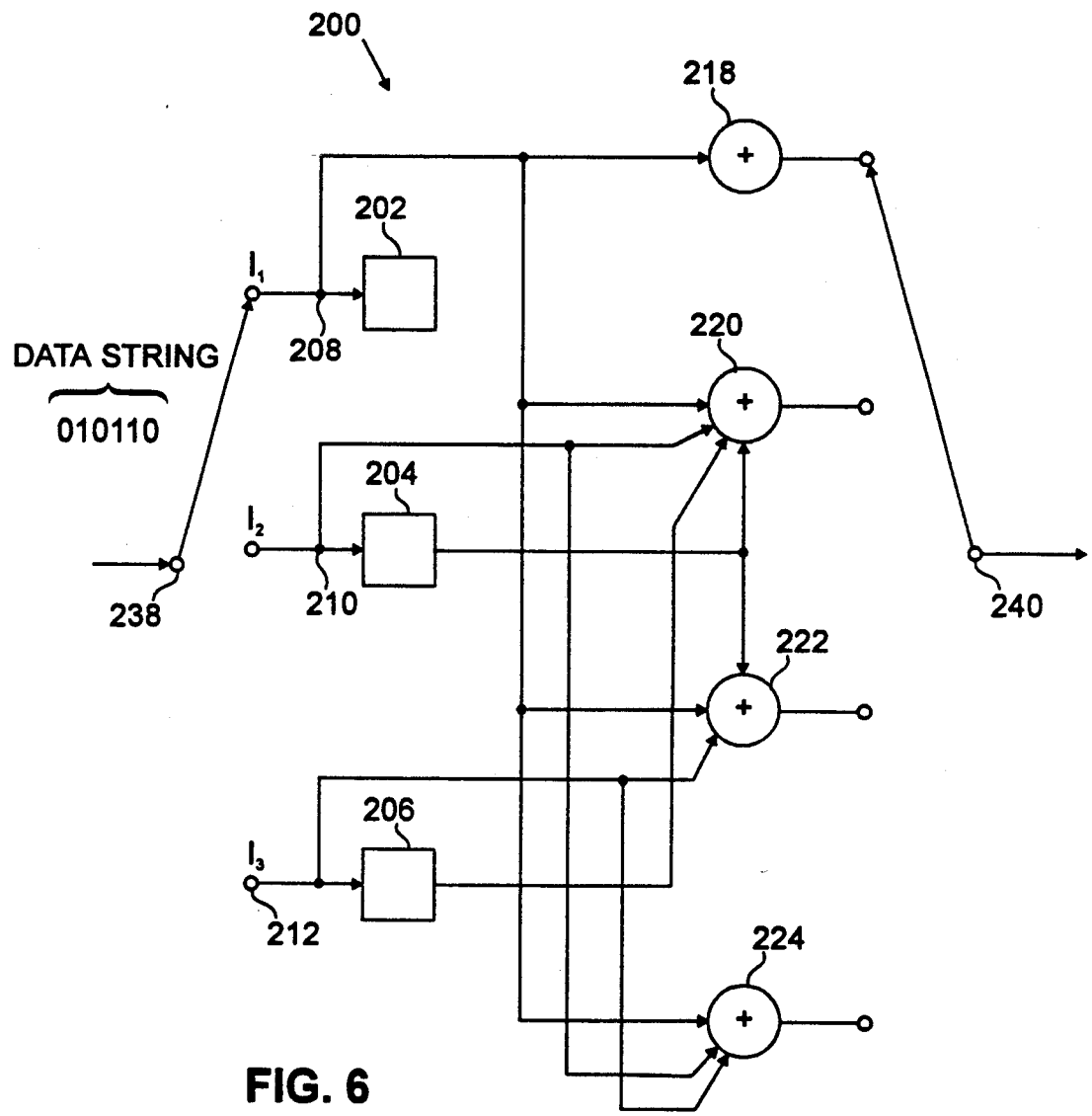
FIG. 6 is a schematic diagram of a data integrity enhancer constructed in accordance with the invention.
Figure 7:
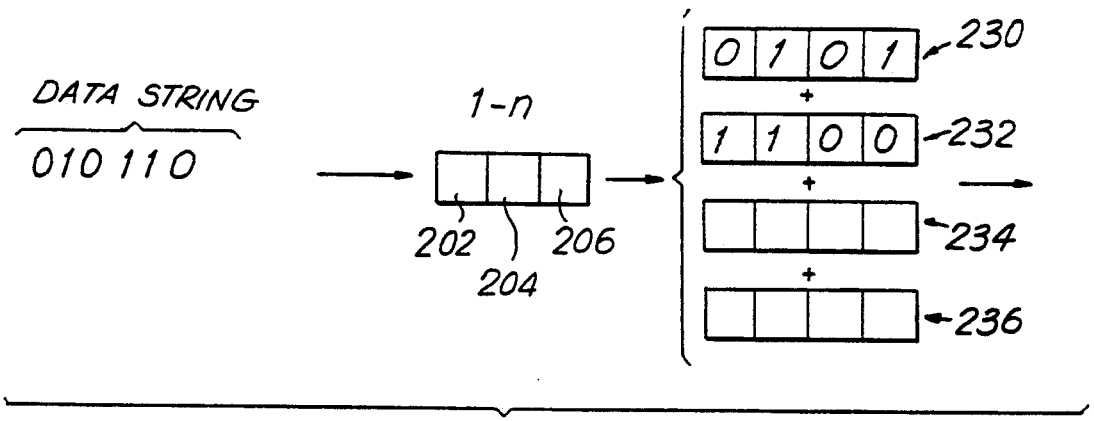
FIG. 7 is a schematic diagram representing the memory as utilized by the data integrity enhancer in accordance with the invention.
Figure 8:
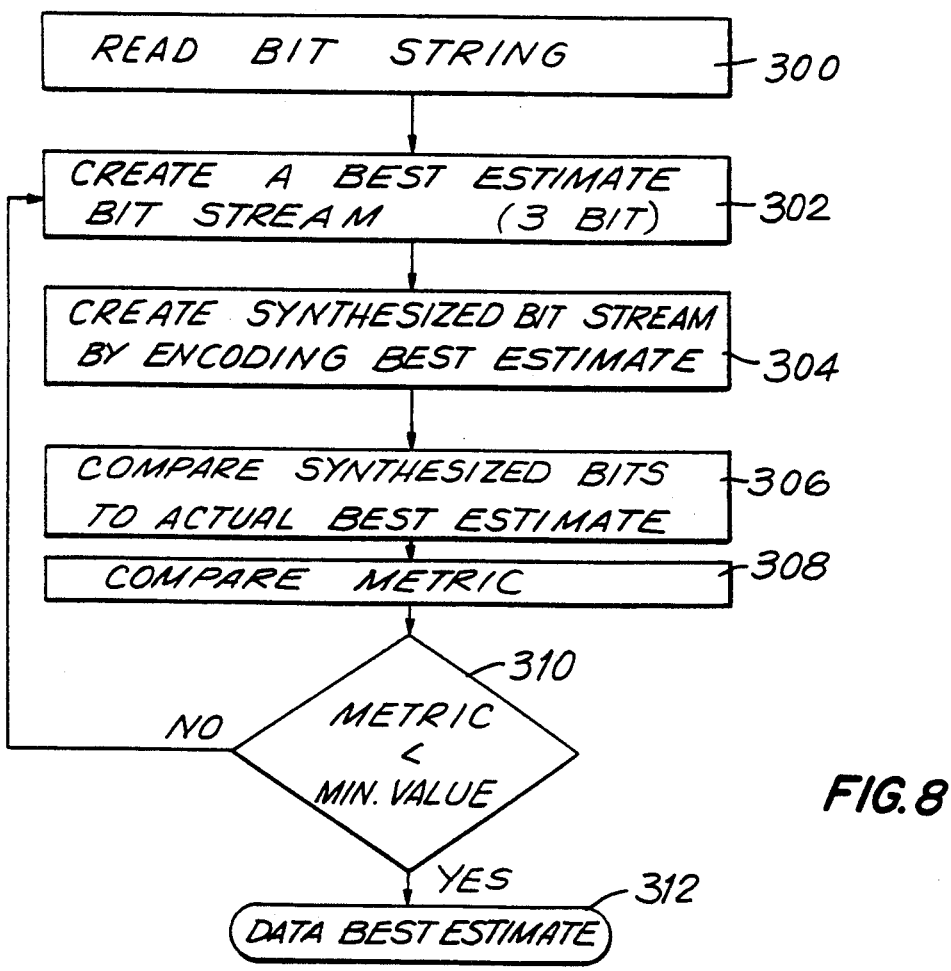
FIG. 8 is a flow chart depicting the process for reading the binary code utilizing convolutional codes in accordance with the invention.

In a second embodiment of the code, data integrity may be provided by storing the data as convolutional encoded subsets of the originally encoded data string. As illustrated in FIGS. 6–8, the data string may be divided into input blocks of M bits, and formed as a convolutional code outputting a series of N (four) bit output blocks 230–236. Each of the binary values of output blocks 230,232 correspond to the visual cells A,B,C and D positioned within matrix 10 without the repetition or redundancy discussed above, i.e. only the root cell shown by the darker letters of FIGS. 3a, 3b, 3c would be present within matrix 10.

Reference is made to FIGS. 6 and 7 in which a data integrity enhancer 200 constructed in accordance with the invention and contained in CPU 28 of FIG. 4 is provided. In this embodiment, rather than utilizing redundancy, in order to conserve bit cell overhead in the printed data, the data string is converted into a convolutional code. The amount of desired convolution is then input into CPU 28. The amount of convolution may range from dividing the code into output blocks 230-236 of two bit length up to an infinitely long data string. Additionally, the data string to be encoded may be operated upon in input block sections as small as one bit or as large as the entire data string. For ease of explanation, data integrity enhancer 200 operates on the data string three bits at a time and outputs a convolutional code having output blocks 230, 232, 234 and 236 of four bits. This is known as a 4-3-1 convolutional code.

The data string of the code to be input is temporarily stored in three one bit memory buckets 202, 204, 206 while being encoded by data integrity enhancer 200. Accordingly, memory buckets 202, 204, 206 may be considered as a three bit parallel input memory which retains the bits of the data string until the next three consecutive data bits of the data string are input to memory buckets 202, 204, 206. Data integrity enhancer 200 includes a variable switch input 238 which sequentially selects between one of an input $I_1$, input $I_2$ and input $I_3$ and then returns to input $I_1$ so that the first bit of a three bit input is always input at $I_1$ and the second input of the data string is input at $I_2$ and similarly, the third of the three bits is input at $I_3$. Memory bucket 202 receives the input of $I_1$. Memory bucket 204 receives the input of $I_2$ and memory bucket 206 receives the input of input $I_3$.

Data integrity enhancer 200 includes four adders, 218, 220, 222, 224 which act substantially as EXCLUSIVE-OR gates. Adder 218 receives an input from a terminal 208 disposed between input $I_1$ and memory bucket 202. Accordingly, adder 218 receives the input of input $I_1$ prior to memory bucket 202. The second adder 220 also receives the input from terminal 208. Adder 220 has a second input from a terminal 210 disposed between input $I_2$ and memory bucket 204. Adder 220 also receives the outputs of memory buckets 204, 206. Adder 222 receives as a first output the value from terminal 208, as a second input the output of memory bucket 204, and a third input from a terminal 212 located between input $I_3$ and memory bucket 206. Adder 224 receives a first input from terminal 208, a second input from terminal 210 and a third input from terminal 212. A variable output switch 240 sequentially selects the output of adders 218, 220, 222 and 224 which are utilized to construct output blocks 230-236. Output blocks 230-236 are converted to the cells 20, 22 of matrix 10.

During operation, each of memory buckets 202, 204 and 206 is set with an initial 0 value. By way of example, the first six bits of the data string to be enhanced are 010110. The bit string is input to data integrity enhancer 200 from left to right so that 010 are the first three data bits to be input. Input switch 238 selects input $I_1$ and the value 0 is present at input $I_1$. Input switch 238 then selects input $I_2$ and the next data bit a 1 is input at $I_2$. Input switch 238 then selects $I_3$ and inputs the next data string bit having a 0 value to input $I_3$.

The input at adder 218 is a 0 as that is the value at terminal 208 when a 0 is input at input $I_1$. Variable output switch 240 selects the output of adder 218 and assigns the 0 as the first bit of output block 230, the first output block of the code. Variable output switch 240 then selects the output of adder 220. Adder 220 has an input of 0 from terminal 218, 1 from terminal 210 and 0s from each of memory buckets 204, 206. As a result, adder 220 outputs a 1. Variable output switch 240 then selects the output of adder 222. Adder 222 receives an input of 0 from memory bucket 204, an output of 0 from terminal 212 and an output of 0 from terminal 208. As a result, the output of adder 222 is 0 which is input as the third value of subgroup 230. Lastly, variable output switch 240 selects the output of adder 224. Adder 224 receives a 0 input from terminal 208, a 1 input from terminal 210 and a 0 input from 212. The output of terminal 224 is a 1 which is output as the fourth value of the subgroup. Accordingly, output block 230 has the value of 0101 based upon original data string values 010. Simultaneously, memory buckets 202, 204 and 206 having only a 1 bit memory capacity dump the values contained within their memories to make room for the input values.

The second output block 232 is formed by encoding the second three bits 110 of the data string. Accordingly, the input of $I_1$ is a 1, the input of $I_2$ is a 1 and the input at $I_3$ is a 0. The 0s of memory buckets 202, 204 and 206 are lost and replaced by the values of 0, 1 and 0, respectively. Accordingly, the input value of adder 218 is a 1 resulting in an output value of 1 which forms the first bit of output block 232. Adder 220 receives a first input value of 1 from terminal 208, a second input value of 1 from terminal 210, a third input value of 0 output by memory bucket 206 and a fourth value of 1 output by memory bucket 204. Adder 220 outputs the value of 1 which forms the second bit of output block 232. Adder 222 receives a first input value 1 from memory bucket 204 and a second input value 1 from terminal 208 and an input value of 0 from terminal 212. Accordingly, the output of adder 222 is a zero which forms the third bit of output block 232. Adder 224 receives a first input of 1 from terminal 208 a second input 1 from terminal 210 and a third input of zero from terminal 212. The output from adder 224 is 0 and forms the fourth bit of output block 232. Accordingly, output block 232 has the value 1100.

The next data bits within the data string are converted to a convolutional code forming output blocks 234-236 et. seq. in the identical manner until the data string has been completely converted. The data string is followed by three 0s to place 0s in each of memory buckets 202, 204 and 206 to move the last bits of the data string out from data integrity enhancer 200, ensuring that the entire data string has completed convolutional encoding The output blocks corresponding to visual cells A, B, C, D of the root cell are placed within matrix 10 in any of a number of formatted scattered patterns.

As can be seen, more data is output by data integrity enhancer 200 than is input. However, since the output blocks of data integrity enhancer are linearly related to the input blocks by a known mathematical relationship, for a specific convolutional code, less expansion (redundancy) of the code to be stored is required than the redundancy data integrity enhancer procedure. Additionally, because each successive output block utilizes common data string inputs with its preceding output block, the relationship between successive output blocks 230, 232, or 234, 236 as well as preceding output blocks may be utilized to determine the correct data bit construction of output blocks of 230, 232. For example, if matrix 10 became damaged and the encoded version of output block 230 became 0111 rather than 0101, by knowing the output block which precedes output block 230 and the values of output block 232, it becomes possible to determine the error in output block 230 with a high degree of probability. Therefore, the integrity, i.e. ability to accurately reproduce the coded information does not decrease even if a portion of the matrix becomes unreadable.

The example above utilized three memory buckets forming subgroups of four bits. However, it should be known that the internal construction of data integrity enhancer 200 is by way of example only and other convolutional code systems such as 2-1-3 (two outputs from one input utilizing three memory buckets) may be utilized. The number of memory buckets may be as small as one or as large as the entire data string. Additionally, the output blocks may be as small as two bits or infinitely large. Each of these selections, size of the outputs and the number of memory buckets determines the degree of bit overhead needed within the matrix 10 as well as a level of convolutional logic applied to the data string. Data integrity enhancer 200 may be formed either as hardware as a forward shifting bit register utilizing EXCLUSIVE-OR gates or may be performed by software represented by FIG. 6.

Matrix 10 may be read by the apparatus of FIG. 4. The visual image of matrix 10, along with the surrounding area, is captured by an optical scanner 24 which converts the visual image into a series of electronic impulses. Scanner 24 may be a light sensitive electronic array, optical CCD camera, linear array scanner, laser reader adapted for two dimensional scanning, ultrasound or the like.

The electronic impulses produced by scanner 24 are transmitted to a digitizer 26 which converts these electronic impulses into a series of computer recognizable binary data bits corresponding to the scanned image. Each visual cell is assigned a binary numeric value based upon the strength of light sensed by optical scanner 24. Visual cells which are absolute black and absolute white are assigned the highest and lowest values respectively, while shades in between are assigned incremental values forming an electronic image of the scanned matrix 10. This image is transmitted to a central processing unit of a computer 28 ("CPU") which stores a bit mapped image of matrix 10 and a part of its surrounding area as a reference within its memory.

Matrix 10 is not always scanned in a readily discernable orientation relative to scanner 24. Accordingly, CPU 28 conducts a binary search to locate the encoded pattern and determine the orientation of matrix 10 as stored in CPU 28. The uniqueness of perimeter 11 of matrix 10 affords a reference point. Each matrix 10 contains two solid dark sides 12. CPU 28 searches for either solid dark side 12 and upon finding it searches for the intersection of the dark sides 12. By locating the corner at which sides 12 intersect, CPU 28 identifies the specific location of matrix 10 regardless of size or orientation within the scanned visual field. CPU 28 then measures the length of each solid black line 12 stored within its memory and the angle at which lines 12 intersect. CPU 28 then calculates where the opposite corner of matrix 10 is located. By utilizing the length and angle of intersection of sides 12, matrix 10 is always recognizable even though it may have been subjected to substantial linear deformation during the digitizing process as long as the binary image remains a parallelogram. Additionally, the uniqueness of perimeter 11 allows CPU 28 to differentiate matrix 10 from other symbols or images within the scan field.

Reference is now made to FIG. 5 in which a flowchart for reading and decoding matrix 10 is provided. Once the four corners of matrix 10 have been identified, CPU 28 counts the alternating dark and light squares 16, 18 of perimeter sides 14 in accordance with a step 100. When sides 14 are of an identical construction, one side 14 is used as a check against the second side 14 to validate the information contained therein in step 102. In step 104, CPU 28 calculates the product of the number of squares contained in each side 14 and determines the density of cells contained within matrix 10. By calculating the angle of the matrix, the matrix size and the matrix density, CPU 28 can calculate the position of each visual cell 20, 22 relative to the intersecting lines 12 in accordance with a step 106. Thus, the center of each visual cell 20, 22 can be determined. CPU 28 now knows the physical size of the pattern to be decoded, the total number of visual cells or their electronic equivalent stored as data 19 and the location of the center of each visual cell 20, 22 in relation to the four corners of matrix 10. Since physical size and cell density of matrix 10 are calculated values rather than predefined, CPU 28 may recognize and decode a matrix 10 of any physical size or density.

The pattern of data 19 is decoded by first identifying the pattern distribution key in accordance with step 108. The distribution key will always be stored as a number of visual cells located at a specific position relative to the corners of matrix 10. Accordingly, in step 110, once the orientation of matrix 10 is determined by CPU 28, CPU 28 retrieves from its bit mapped image of matrix 10 the electronic equivalent of the visually encoded key cells. Upon decoding of these key cells, as in step 112, CPU 28 is informed which of the 256 cell distribution patterns was employed to encode data 19 within matrix 10. In accordance with step 114, once the distribution pattern is determined, CPU 28 will reunite the appropriate cells to re-form the binary character strings corresponding to the binary character strings originally input for encoding.

The apparatus of FIG. 4 decodes the data string in accordance with the method of FIG. 8. The read matrix is formed into a data string and stored in memory. Since there are only sixteen possible combinations in which to form output blocks 230-236, it is possible to calculate all sixteen combinations for each output block in the matrix. It is possible to eliminate several of the sixteen possible combinations as being most unlikely to occur based upon the known operation of data integrity enhancer 200. Accordingly, a synthesized data stream is generated in a step 302 representing the best estimate as to what the actual bit string read and selected in step 300 would be if decoded. Accordingly, the synthesized bit stream is formed of three bit groupings as is the decoded version of each of the output blocks.

In a step 304, the synthesized bit stream generated by CPU 28 is operated upon by data integrity enhancer 200 to produce a synthesized convolutional encoded data string formed of four bit output blocks.

The synthesized convolutional encoded data string of step 304 is compared with the read convolutional code data string in a step 306. A metric, representing the closeness of the match between the two codes, is also calculated in a step 308. If the metric is greater than a predetermined minimum value as determined in a step 310, then the probability that the data constructed in step 302 is a valid interpretation of the data string encoded in matrix 10 is extremely high and CPU 28 utilizes the synthesized data of step 302 as the actual answer in a step 312. If however the metric is less than a minimum calculated value, then the probability is high that an invalid data string has been constructed in step 302 and the process is begun again at step 302 creating another best estimate.

The above method is by way of example. Another approach for decoding the convolutional coded data is to use a predictor/corrector method.

To generate matrix 10, CPU 28 must reverse the process and first convert the 0, 1 binary language of the computer to the dark/light visual cells 20, 22 of matrix 10. CPU 28 calculates the maximum number of character variations expected at each position of the input string and then determines the minimum number of visual cells required to encode that number of variations. The compression process varies depending on the type of input character anticipated. For instance, if it is known that only numerics will appear at a given input location, the eight bit binary numbers can be compressed to 3.32 visual cells; if all alphabetic characters are anticipated, an eight bit binary letter can be compressed to 4.75 visual cells; or, if the input character could be either alphabetic or numeric the compression algorithms reduce each input character from eight binary bits to 5.21 visual cells.

Further, the system may make use of the available "partial" cells. For example, the first alphanumeric character will require six visual cells (smallest integer $\geq 5.21$) while the second alphanumeric character will require only five (10.42 cells—6 for the first character =4.42 rounded to 5). This allows for the enhanced binary compression as described above and thereby further reduces the necessary density of matrix 10. If it were known as in FIG. 1a, that the ten characters to be input were to be all numeric (0 through 9), CPU 28 would determine through use of the compression algorithm that the number of potential binary variations could be accommodated by thirty-four (34) visual cells rather than eighty (80) visual cells as would be otherwise supposed.

The user then inputs into CPU 28 the type of visual cell distribution within matrix 10 desired. The amount of desired redundancy is then input into CPU 28 ranging from no redundancy to as high as 400% repetition of the pattern. CPU 28 analyzes the pattern of the root visual cell to be encoded and positions the redundant data cells farthest from the root cell to achieve the highest probability of survival of at least one cell in the event of destruction of a part of matrix 10 (FIGS. 3a, 3b, 3c, 3d).

If a convolutional code is utilized for data integrity then the level of integrity is chosen by inputting to CPU 28, the size of the subgroup, the number of bits to be input to data integrity enhancer 200 and the number of memory buckets to be utilized. Integrity may also be enhanced by selecting one of several convolutional encoding procedures.

The number of visual cells required for the encoded data is then computed and added to the number of visual cells required as distribution key cells to determine the density of matrix 10. The square root of this total is then determined to establish the number of squares required to form sides 14 of perimeter 11 of matrix 10. Finally, the user desired physical size of matrix 10 is input to determine the length of sides 12 of matrix 10. Upon calculation of all these values, CPU 28 causes a printer 30 to produce the newly generated matrix 10.

It is to be noted, that the generated matrix utilizes a binary code by way of example. Utilizing the methods and structures above, it is possible to encode within the matrix any N-ary electronic code including two-ary (binary), ternary, quaternary or the like by converting the electronic representation of the code into another representation such as an optical code or sonically scanned code. Additionally, the shape or pattern of matrix 10 need not be limited to easily definable geometric shapes such as squares, rectangles, circles, or other polygons or the like. Matrix 10 may exhibit other shapes and patterns having a border such as Z patterns or the like. The square matrix above is used for ease of description.

By providing a machine readable two dimensional binary code having a perimeter which indicates the physical size of the code on two of its sides and the density of the encoded material on two of its sides, a data code which is dynamically variable as to size and density of information contained therein is provided.

It will thus be seen that the objects set forth above, among those made apparent from the preceding description, are efficiently attained and, since certain changes may be made in carrying out the above process and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An apparatus for executing operations on an electronic N-ary code formed of a plurality of N-ary digits, comprising means for receiving said electronic code and means for generating a machine readable optical code in response to the received electronic code, and said machine readable optical code comprising data formed as a matrix of a plurality of data cells representing the electronic code and a nondata area enabling recognition of said data area, wherein said matrix includes a perimeter, said perimeter being formed with density indicia means for determining the density of data contained within the matrix, said density indicia means including a first side of the perimeter and a second side of the perimeter each being formed of a broken line pattern formed of alternating dark areas and light areas, the product of the number of said light areas and dark areas of the first and second sides corresponding to the density of data contained within the matrix; data integrity enhancer means for dividing said N-ary code into a plurality of input blocks and forming input blocks into output blocks, said output blocks forming said data cells, said output blocks being formed as a linearly determined function of the N-ary values of said N-ary digits of said electronic code thereby representing the electronic code with enchanced data integrity.

2. The apparatus of claim 1, wherein said electronic code is divided into input blocks and each input block has a N-ary digit length M and each of said output blocks has a N-ary digit length N, M being less than N.

3. The apparatus of claim 1, wherein said electronic code is a binary code and said N-ary digits are bits.

4. The apparatus of claim 3, wherein a subset of said data cells represents a single binary character.

5. The apparatus of claim 1 wherein said output blocks are formed sequentially by said data integrity enhancer means, a respective output block being a linearly determined function of at least one of said input block immediately sequentially preceding said respective output block.

6. The apparatus of claim 1, wherein said data cells visually represent the electronic code.

7. The apparatus of claim 1, wherein said output blocks are formed of N-ary digits corresponding to said plurality of data cells and further comprising scattering means for situating said data cells within the matrix so that said N-ary digits which are closely tied logically are not situated adjacent one another within the matrix.

8. An apparatus of executing operations on an electronic executable binary code, comprising means for receiving said electronic executable binary code and means for generating a machine optically readable binary code in response to the received electronic executable binary code, said machine optically readable binary code comprising data formed as a matrix, said matrix being formed as plurality of data cells, said data cells representing the electronic executable binary code; data integrity enhancer means for forming said electronic binary codes into output block, said output blocks forming said data cells and being formed as a linearly determined function of the binary values of said electronic binary code; said electronic binary code being formed as input blocks, each input block having a bit length M and each of said output blocks having a bit length N, M being less than N; said output blocks being formed sequentially by said data integrity enhancer means, a respective output block being a linearly determined function of at least one of said input blocks immediately sequentially preceding said respective output block and scattering means or situating said data cells within the matrix so that said bits which are closely tied logically are not situated adjacent one another within the matrix.

9. A method for forming a machine readable optical code having data formed as a matrix, said data being formed as data cells in a data area, a nondata area enabling recognition of said data area, said data cells representing a data string formed of an electronic N-ary code comprising the steps of:

receiving said electronic code as a data string of electronic values;

dividing said data string into a plurality of input blocks;

forming a plurality of output blocks of equal length by sequentially performing a linear deterministic function of the N-ary values of said N-ary digits of each of said input blocks, said output blocks representing said electronic code with enhanced data integrity; and forming said matrix from said outputs block by scattering said output block N-ary digits so that said N-ary digits which are closely tied logically are not situated adjacent one another in the matrix.

10. The method of claim 9, wherein the N-ary digit length of said output blocks is greater than the N-ary digit length of said input blocks.

11. The method of claim 10 further comprising the step of performing the linear deterministic function on at least one input block utilizing at least a portion of the data contained in an input block sequentially preceding said at least one input block.

12. The method of claim 11 wherein the step of forming a plurality of output blocks further comprises forming a plurality of output block of equal N-ary digit length by sequentially performing convolutional logic on the N-ary values of said N-ary digits each of said input blocks.

13. The method of claim 9, wherein said electronic N-ary code is a binary code and said N-ary digits are bits.

14. An apparatus of executing operations on an electronic N-ary code formed of a plurality of N-ary digits, comprising means for receiving said electronic code and means for generating a machine readable optical code in response to the received electronic code, and said machine readable optical code comprising data formed as a matrix of a plurality of data cells representing the electronic code and a nondata area enabling recognition of said data area; data integrity enhancer means for dividing said N-ary code into a plurality of input blocks and forming input blocks into output blocks, said output blocks forming said data cells, said output blocks being formed as a linearly determined function of the N-ary values of said N-ary digits of said electronic code thereby representing the electronic code with enchanced data integrity; and scattering means for situating said data cells within the matrix so that said N-ary digits which are closely tied logically are not situated adjacent one another within the matrix.

15. The apparatus of claim 14, wherein said electronic code is divided into input blocks and each input block has a N-ary digit length M and each of said output blocks has N-ary digit length N, M being less than N.

16. The apparatus of claim 14, wherein said electronic code is a binary code and said N-ary digits are bits.

17. The apparatus of claim 16, wherein a subset of said data cells represents a single binary character.

18. The apparatus of claim 14 wherein said output block are formed sequentially by said data integrity enhancer means, a respective output block being a linearly determined function of at least one of said input blocks immediately sequentially preceding said respective output block.

19. The apparatus of claim 14, wherein said data cells visually represent the electronic code.

20. The apparatus of claim 14, wherein said matrix includes a perimeter, said perimeter being formed with density indicia means for determining the density of data contained within the matrix, said density indicia means including a first side of the perimeter and a second side of the perimeter each being formed of a broken line pattern formed of alternating dark areas and light areas, the product of the number of said light areas and dark areas of the first and second sides corresponding to the density of data contained within the matrix.

21. A method for forming a machine readable optical code having data formed as a matrix, said data being formed as data cells in a data area, a nondata area enabling recognition of said data area, said data cells representing a data string formed of an electronic N-ary code comprising the steps of:

receiving said electronic code as a data string of electronic values;

dividing said data string into a plurality of input blocks;

forming a plurality of output blocks of equal length by sequentially performing a linear deterministic function of the N-ary values of said N-ary digits of each of said input blocks, said output blocks representing said electronic code with enhanced data integrity; and forming said matrix from said output blocks with a perimeter having a first side and a second side, each side being formed with a broken line pattern formed of alternating dark areas and light areas, the product of the number of said light areas and dark areas of the first and second sides corresponding to the density of data contained within the matrix.

22. The method of claim 21 wherein the N-ary digit length of said output blocks is greater than the N-ary digit length of said input blocks.

23. The method of claim 22 further comprising performing the linear deterministic function on at least one input block utilizing at least a portion of the data contained in an input block sequentially preceding said at least one input block.

24. The method of claim 21 wherein the step of forming a plurality of output blocks further comprises forming a plurality of output blocks of equal N-ary digit length by sequentially performing convolutional logic on the N-ary values of said N-ary digits each of said input blocks.

25. The method of claim 21 wherein said electronic N-ary code is a binary code and said N-ary digits are bits.

* * * * *

UNITED STATES PATENT AND TRADEMARK OFFICE
CERTIFICATE OF CORRECTION

PATENT NO. : 5,324,923
DATED : June 28, 1994
INVENTOR(S) : Robert S. Cymbalski, et al.

It is certified that error appears in the above-indentified patent and that said Letters Patent is hereby corrected as shown below:

Column 4, line 22, after "9" delete ".";

Column 5, line 26, after "possible" insert --.--;

Column 12, line 45 delete "of" and insert --for--;

Column 13, line 41, delete "of" and insert --for--.

Signed and Sealed this

Twenty-sixth Day of August, 1997

Attest:

BRUCE LEHMAN

Attesting Officer
Commissioner of Patents and Trademarks